United States Patent

[11] 3,561,749

[72] Inventor Robert R. Grover
Westport, N.H.
[21] Appl. No. 619,265
[22] Filed Feb. 28, 1967
[45] Patented Feb. 9, 1971
[73] Assignee Kingsbury Machine Tool Corporation
Keene, N.H.
a corporation of Delaware

[54] TORSION SPRING CLAMPING MECHANISM
22 Claims, 12 Drawing Figs.
[52] U.S. Cl. ................................................ 269/224,
269/227, 269/254; 74/110
[51] Int. Cl. ........................................................ B25b 1/20,
B25b 1/06
[50] Field of Search ............................................ 269/90,
224—227, 254, 310, 316; 74/110, 110(F);
100/268, 257 (Cursory)

[56] References Cited
UNITED STATES PATENTS
1,855,939 4/1932 Collins ............................ 269/90X
3,055,654 9/1962 Harrison ......................... 269/224X
2,619,137 11/1952 Hartwell ......................... 269/224X
3,073,589 1/1963 Hohwart ......................... 269/224X
FOREIGN PATENTS
30,056 1/1926 France ............................ 269/224

Primary Examiner—Andrew R. Juhasz
Assistant Examiner—Leon Gilden
Attorney—Diller, Brown, Ramik and Holt ABSTRACT: This disclosure relates to a unitary form of torsion spring clamping mechanism including a vertically reciprocable ram which is movable through a hole in the bottom of a workpiece-holding-nest for engaging against an undersurface of a workpiece and raising the workpiece to contact the undersurface of a clamp plate, then to apply a clamping pressure to the workpiece, against the clamp plate. The ram is vertically driven in guides by a crank connected to a rotatable sleeve, and indirectly, to one end of a torsion spring. The other end of the torsion spring is connected to a rack-and-pinion driving means which is operable upon receiving a motive driving force. Upon movement of the rack and rotation of the pinion, the crank is rotated through the torsion spring which is operative as a coupling, to raise the ram to a clamping point spaced from the clamp plate with the workpiece therebetween. Continued rotation of the pinion gear tensions the torsion spring, relatively displacing the ends of the spring. This allows the pinion gear to always be rotated through an arc of 180°, but the crank which raises the ram will not always be rotated through 180°, depending upon the allowable tolerance variation in the thickness of the workpieces. At the removal of a motive force, the ram will be retained in position, clampingly engaging an associated workpiece under a force applied by tensioning the spring, due to a self-locking feature utilizing friction forces between relatively movable parts.

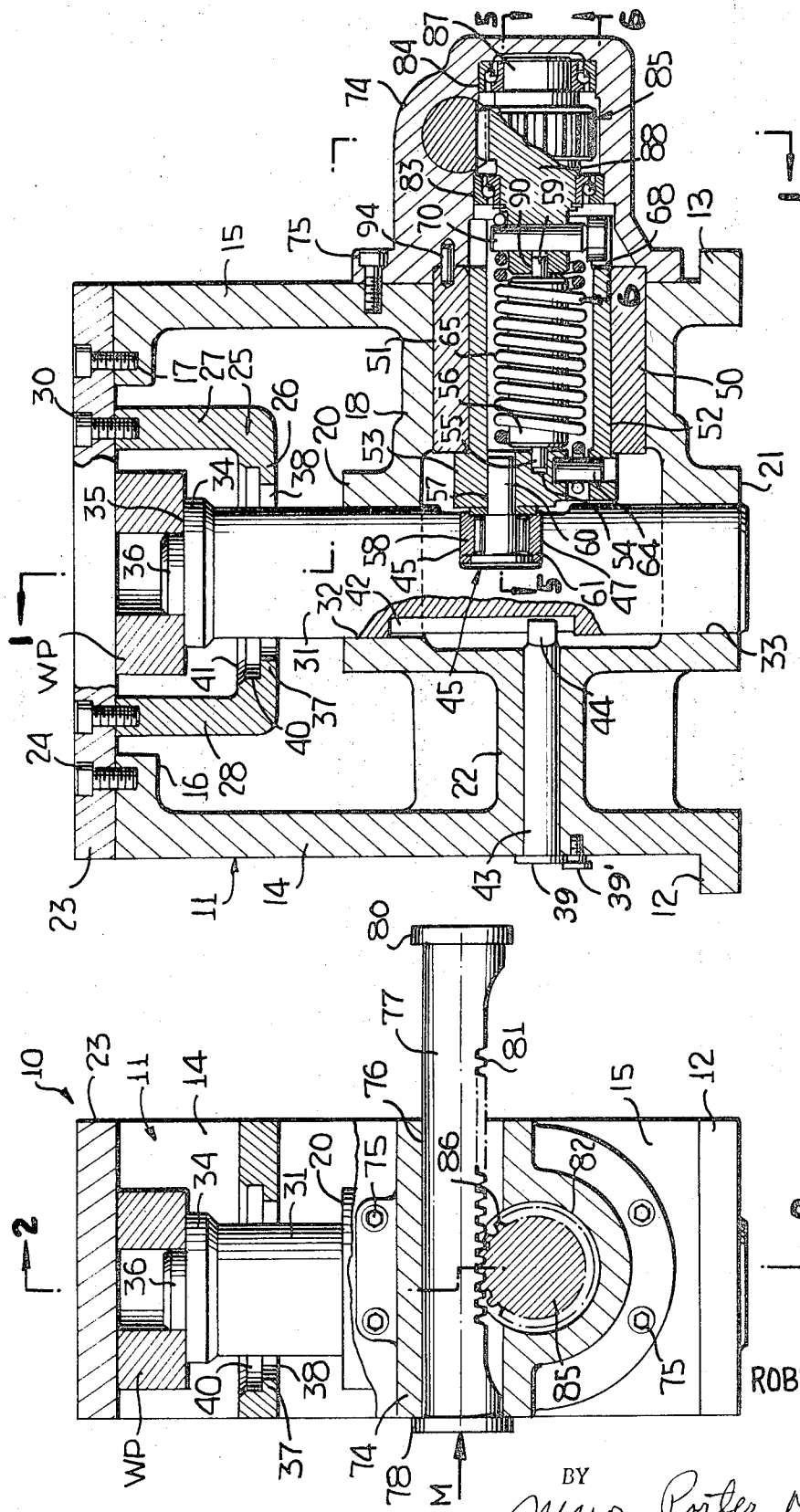

INVENTOR
ROBERT R. GROVER

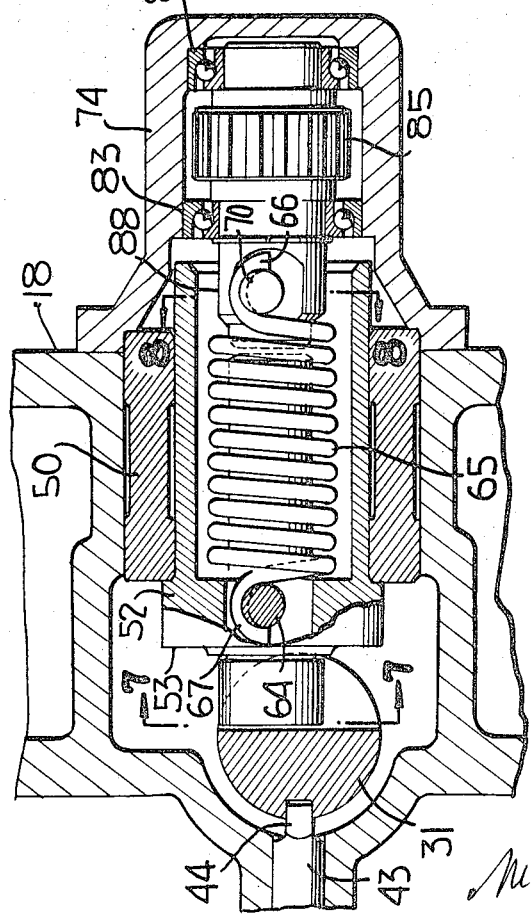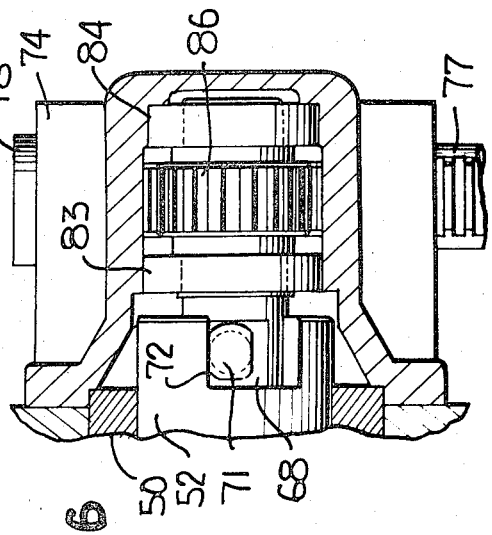

TORSION SPRING CLAMPING MECHANISM

This invention relates to a torsion spring clamping mechanism.

Prior art devices have taught the use of work holders for movable clamping jaws for spring seating the clamps, but have failed to provide mechanisms capable of clamping workpieces that did not necessitate varying the input stroke to the clamping device, depending upon variations in thickness of the workpieces. When a single motive force is provided to operate a plurality of mechanisms, in an operation using a plurality of work stages operated by that same motive force, it becomes necessary to vary the stroke of the motive force supplied at different stations depending upon the thickness of the workpiece at any particular station.

Prior art devices also are not generally of unitary construction, thus presenting assembly difficulties.

The present invention seeks to obviate the above and other undesirable features of prior art clamping devices in providing a torsion spring clamping mechanism of unitized construction which is easy to assemble and disassemble for servicing purposes and the like.

Another feature of the present invention is to provide a mechanism which is adapted to clamp work pieces of various thicknesses, differing in thickness within a predetermined range by tolerance variations or the like, whereby a constant input clamp stroke will forcefully clamp a workpiece to an associated clamp plate, regardless of the thickness of the workpiece within a predetermined range of thicknesses.

Accordingly, it is a primary object of this invention to provide a clamping mechanism which is adapted to be actuated with a fixed force-transmitting stroke, and which will move a workpiece and hold the workpiece engaged against a clamp plate, irrespective of the thickness of the workpiece within a predetermined thickness range.

It is another object of this invention to provide a clamping mechanism which utilizes a torsion spring as a coupling member for receiving a constant input stroke and providing a variable stroke.

It is a further object to provide a clamping mechanism for securing a workpiece to a clamp plate, wherein a vertically reciprocable ram is crank operated through a torsion spring coupling by a rack and pinion.

It is another object to provide a clamping mechanism set forth in the immediately above-mentioned object, wherein means are provided for self-locking the ram in engagement with the workpiece, independent of an outside motive force, both at the clamping station and within the range of applied clamping force.

It is a further object of this invention to provide a novel torsion spring clamping mechanism for engaging a workpiece between a reciprocable ram and a clamp plate, wherein the ram is adapted to withstand a greater opposing force than its clamping force without release of the clamping force.

It is a further object of this invention to provide a torsion spring clamping mechanism for engaging a workpiece against a clamp plate by a reciprocable ram, wherein the ram is self-locking in its engaged position by friction forces between relatively movable parts.

It is a further object of this invention to provide a torsion spring clamping mechanism for receiving a fixed force-transmitting stroke at the input thereof and for engaging and moving a workpiece to a clamping station and securely clamping the workpiece at the station, wherein the torsion spring is first pretensioned, and then further tensioned by relatively angularly displacing the spring ends an amount corresponding to the tolerance deviation of the workpiece from a workpiece of minimum thickness.

It is yet further object of this invention to provide a novel torsion spring clamping mechanism which is adapted to receive a first motive force which is operable through a coupling device to raise a ram to clamp a workpiece against a clamping plate, and which is then operable upon receiving a reversely directed motive force to effect an unclamping of the workpiece with respect to a clamp plate and to return the workpiece to its original position.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a vertical sectional view of the clamping mechanism of this invention, taken along the line 1-1 of FIG. 2, and wherein the ram is shown in its extreme upward clamped position, with a workpiece between the ram and clamp plate, and with the constant stroke rack illustrated in the fully clamped position of the mechanism.

FIG. 2 is a vertical sectional view taken along line 2-2 of FIG. 1, and wherein the torsion spring coupling between the ram and pinion gear is illustrated in the fully clamped position of the mechanism.

FIG. 5 is an enlarged fragmentary sectional view of the torsion spring coupling device of the mechanism of this invention, taken along the line 5-5 of FIG. 2, and wherein there is illustrated in greater detail the torsion spring coupling device operatively connecting the pinion gear and vertically movable ram of the clamping mechanism.

FIG. 6 is en enlarged fragmentary sectional view of one end of the coupling device of the mechanism of this invention, taken along the line 6-6 of FIG. 2, and wherein there is illustrated the engagement of one of the spring pins in the annular slot on the crank body or sleeve.

FIG. 7 is an end view of the frictionless bearing and crank of this invention, taken along a line similar to that 7-7 of FIG. 5 but wherein the antifriction bearing is illustrated in its bottom dead center position.

FIG. 7A is a view similar to that of FIG. 7, but wherein the crank has been pivoted in the position illustrated in FIG. 7, in the direction of the arrow designated to a position closely approaching 180° from that illustrated in FIG. 7, wherein the antifriction bearing approaches its top dead center position.

FIG. 7B is a view taken along the line 7-7 of FIG. 5, with the antifriction bearing being illustrated in its top dead center position.

Figure 4:
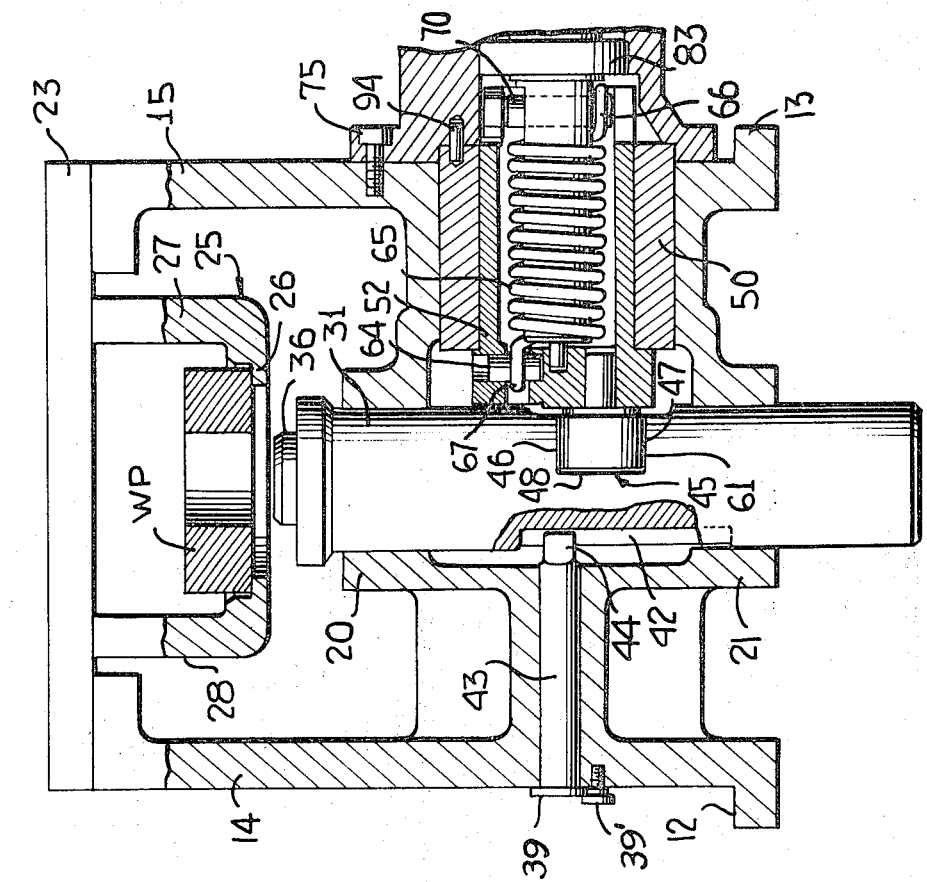
FIG. 4 is a vertical sectional view of the mechanism of this invention, taken along line 4-4 of FIG. 3, and is generally similar to the illustration of FIG. 2.

FIG. 8 is a cross-sectional view through the crank sleeve and pinion gear extension, taken along a line similar to that 8-8 of FIG. 5, but wherein the spring pin is illustrated in engagement against one end of the annular slot in the crank sleeve, with the torsion spring in a prestressed condition, in which position of the spring pin the antifriction bearing associated with the ram is in the bottom dead center position of FIG. 7, and the ram in its lowermost position.

FIG. 8A is a view generally similar to that of FIG. 8, but wherein the pinion gear extension has been rotated 180°, such that the torsion spring has been tensioned an additional amount such that the angular spacing of the spring pin of FIG. 8 from its associated abutment edge comprises an angle equal to that which the frictionless bearing illustrated in FIG. 7A is offset from top dead center.

FIG. 8B is a cross-sectional view taken along the line 8-8 of FIG. 5, and wherein the pinion gear extension, spring pin, and crank sleeve of FIG. 8 are illustrated as having been pivoted through 180°, with the spring pin in engagement against the associated slot end of the crank sleeve, the spring being unstressed beyond its prestressed condition.

Referring now to the drawings in detail, reference is first made to FIG. 1 wherein there is illustrated the torsion spring clamping mechanism, generally designated by the numeral 10. The mechanism 10 includes a supporting body 11 having lower base portions 12 and 13, upstanding walls 14 and 15, plate supporting lugs 16 and 17, coupling housing portion 18, upper and lower ram housing portions 20 and 21, and aligning member housing portion 22.

The lugs 16 and 17 have secured thereto, at their upper surfaces, a clamp plate 23 by means of screw members 24.

A work nest or work supporting member 25, comprising a bottom portion 26 and leg portions 27 and 28 are secured by means of screw connection members 30 to the clamp plate 23, with the screw connection members 30 engaged in legs 27 and 28 of the work supporting member 25.

A ram 31 is provided, slidably retained in upper and lower ram housing portions 20 and 21, and longitudinally slidable in respective surfaces 32 and 33 thereof. The ram 31 is of generally cylindrical configuration, having a work holding portion 34 at the upper end thereof, adapted to engage a workpiece WP on a ram upper supporting surface 35. A generally cylindrical aligning portion 36 of the ram 31, is provided, coaxially disposed with respect to the ram 31, and adapted to engage within a center hole of the workpiece WP.

The nesting member 25 on the base portion 26 thereof, includes a workpiece supporting portion 37, having a ram clearance hole 38 disposed centrally thereof, in order to facilitate removal and entry of the ram into the nesting member 25. A lower surface of the workpiece WP is adapted to rest on the supporting portion 37, closely fitting against nest sidewall portion 40. The sidewall portion 40 is chamfered at its upper end 41, to facilitate entry of the workpiece WP into seated relation within the nest space or supporting portion 26.

The ram is provided with a longitudinally disposed groove 42, at a leftward surface thereof, as viewed in FIG. 2.

An aligning member 43, having a tongue 44 at one end thereof, and a stop element 39 at the opposite end thereof, is housed within a housing portion 22, with the tongue 44 is a sliding engagement in the groove 42 of the ram 31, to maintain orientation of the ram 31 during the reciprocation thereof. Aligning member 43 is secured in position with the tongue 44 within the groove 42 of the ram 31, by screw connection member 39', secured to supporting wall 14 of the housing or body 11.

A slot extends across an opposite side of the cylindrical ram 31 from that in which the groove 42 is cut, the slot 45 comprising upper and lower surfaces 46 and 47 respectively, and side surface 48.

A bushing is engaged within a bore 51 through the coupling housing portion 18, the bushing 50 being secured to the housing portion 18 in press-fit relation.

A crank body or sleeve 52 is slidably engaged within the bushing 50, for rotation therein. The crank body 52 terminates at its leftward end, as viewed in FIG. 2, in a crank end portion 53. A blind hole 54 is provided at the inner surface of the crank end portion 53, aligned with the longitudinal axis of the crank body or sleeve 52. The blind hole 54 is adapted to slidably receive one end portion 55 of a spring guide 56. A bore 57 is provided, parallel to the blind hole 54, extending through the crank end portion 53, but eccentrically offset from the longitudinal axis of the crank body or sleeve 52. A antifriction track roller 58 is provided, having its stud 60 secured within the bore 57 of the crank end portion 53, and having its frictionless rolling portion 61 engaged within the slot 45 of the ram 31.

With particular reference to FIG. 7 it is illustrated that an arcuate slotted hole 62 is provided, extending through the crank end portion 53, about an opposite side of the end portion 53 from that having the stud bore 57 therein. A cross bore 63 is provided, traversing the slotted hole 62, in which is received a pin 64, the axis of the pin 64 being offset somewhat below the axis of the crank 52, as viewed in FIG. 7.

A torsion spring 65 is provided, having opposite end portions 66 and 67. The spring 65 is disposed within the crank body or sleeve 52, about the spring guide 56 and the left end 67 thereof, as viewed in FIG. 2, is secured about the pin 64 in the crank end portion 53, the spring end 67 extending through the arcuate slot 62 in its engagement with the pin 64.

The sleeve 52 is provided with a milled arcuate slot 68 at one end thereof, in which is slidably received a pin 70, secured to an extension of a pinion gear, in a manner later to be described.

With reference to FIG. 8, it is seen that the leftmost end 71 of the pin 70 is in engagement with an end portion 72 of the milled slot 68, the pin being secured thereagainst by a pretension or preset stress in the spring 65. The rightward end of the pin 70, as viewed in FIG. 8 is provided with the groove 73, in which the end 66 of the spring 65 is secured, urging the end 71 of the pin 70 against the end 72 of the slot 68.

A rack and pinion housing 74, is provided, secured to support portion 15 of the housing 11, by means of screw connection means 75. The housing portion 74 includes a transverse bore 76, in which a rack 77 is slidably secured. The rack 77 has opposite abutment ends 78 and 80 which limit the forward and rearward movement of the rack 77. The rack 77 is also provided with gear teeth 81 on its lower surface. The housing portion 74 is also provided with a longitudinal bore 82, which receives antifriction bearing assemblies 83 and 84, in press-fit engagement therein, with a pinion gear 85 secured therebetween, with gear teeth 86 in engagement with the gear teeth 81 of the rack 77. The pinion gear 85 is provided with stud portions 87 and 88, engaged for rotation in the respective bearing assemblies 84 and 83.

The stud portion or pinion gear extension 88 is provided with a blind longitudinal bore 90, at its end thereof remote from the gear teeth 86 to receive the end 59 of the spring guide 56. The stud portion 88 is also provided with a cross bore 91, as viewed in FIG. 8, with its axis spaced somewhat below the axis of the stud portion 88 and has flat opposite sides 92 and 93, at least one of which facilitates engagement of the end 66 of the spring 65 within the groove 73 of the spring pin 70, the spring pin 70 being disposed within the cross bore 91.

An aligning pin 94 may also be provided, for aligning the rack and pinion housing 74 within the bushing 50.

OPERATION

To raise the workpiece WP from its nested portion in the nesting support 25 to contact the clamp plate 23, a motive force M is applied to the end 78 of the rack 77, as designated by the arrow at the left of the rack 77 viewed in FIG. 1. The rack 77 thus moves to its extreme rightward position, as viewed in FIG. 1, whereby the end 78 abuts against an adjacent portion of the rack and pinion housing 74. During this movement of the rack 77 the pinion gear 85 is rotated through an arc of 180°, by interengagement of the gear teeth 81 and 86 on the rack 77 and pinion gear 85.

The pinion gear 85 is freely rotatable in the bearing assemblies 83 and 84 and the stud portion or extension 88 of the pinion gear 85 also pivots the spring pin 70 through an arc of 180°, from the position illustrated in FIG. 8 to the position illustrated in FIG. 8A. As the pinion gear 85 is pivoted, and the spring pin 70 is likewise pivoted, the crank sleeve 52 is also pivoted, with the pin 70 and crank sleeve 52 moving together, as a unit, with the pin end 71 in engagement against the slot abutment 72 because of the prestressed condition of the spring 65. Thus, as the pinion gear 85 begins its pivoting, the rotational force from the moving rack 77 is transmitted through the spring 65, to the crank end portion 53, and through the spring pin 64.

Figure 3:
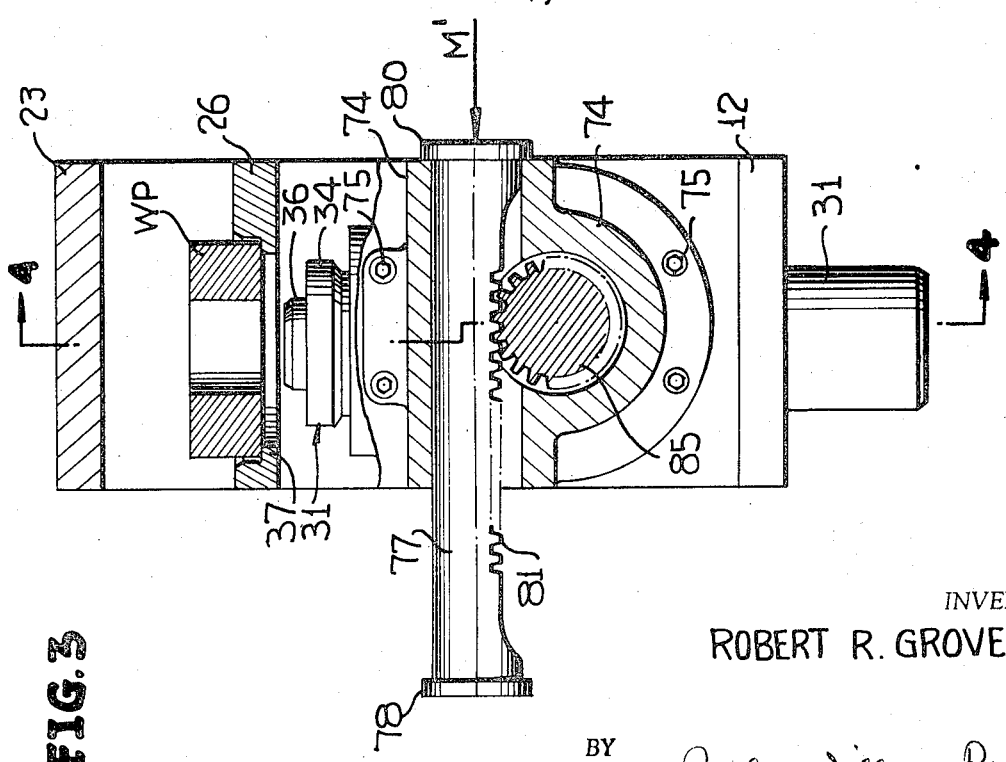
FIG. 3 is a vertical sectional view of the mechanism of this invention, similar to that of FIG. 1, but wherein the ram is illustrated in its lowermost position, with the workpiece nested in its holding member, and with the rack in the extreme unclamped position of the mechanism.

During the pivoting of the crank end portion 53, the antifriction roller 58 is pivoted eccentrically relative to the longitudinal axis of the crank body or sleeve 52, whereby the frictionless roller 58 rolls on upper surface 46 of the slot 45, raising the ram 31 from its lower most position illustrated in FIGS. 3 and 4, upwardly, to pass through the workpiece nesting member 25, and to engage an undersurface of the workpiece WP with the aligning portion 36 of the ram 31 engaged within the bore of the workpiece WP, and with the workpiece WP supported on the upper surface 35 of the ram 31.

As the pinion gear extension 88 pivots from the position illustrated in FIG. 8, towards that illustrated in FIG. 8A, the rolling portion 61 in engagement in the slot 45 moves from its bottom dead center position illustrated in FIGS. 4 and 7, in the direction of the arcuate arrow of FIG. 7, toward the position illustrated in FIG. 7A. In this position of the roller 58, the ram 31 has engaged the workpiece WP and raised it upwardly to a position against the clamp plate 23 as viewed in FIGS. 1 and 2.

If the workpiece WP is of the minimum thickness with which the clamping mechanism has been designed to clamp, upon rotation of the pinion extension 88 to the position illustrated in FIG. 8B, and consequent rotation of the spring pin 70 to the position illustrated in FIG. 8B, the crank sleeve 52 will also be rotated the full 180°, as will the roller 58 also be rotated or pivoted the full 180° from the position illustrated in FIG. 7 to the position illustrated in FIG. 7B, whereby the roller 58 will be in a top dead center position, with the workpiece WP clamped against the clamp plate 23, However, it is well known to all persons skilled in the machine arts that a workpiece WP will not be made to precise dimensions, but that there will be variations in thickness of workpieces, the range of thickness variation being dependent upon the permissible tolerance variation in the thickness of the workpiece.

This range between maximum and minimum thicknesses of the workpiece, whether due to tolerance or otherwise, is designated by the letter X in FIG. 7A. If the maximum stroke of the ram, when a workpiece WP of minimum thickness is used can be designated as 2Y, Y being the distance measured from the center of the antifriction roller 58 to the longitudinal central axis of the clamp end portion 53, then, when a workpiece WP is utilized having a greater thickness X than that of the minimum workpiece, the stroke of the antifriction roller 58 and the consequent stroke of the ram 31 will be designated by Y plus Z, with reference to FIGS. 7 and 7A, respectively, Thus, the ram 31 will fail to go to its extreme upward position, by an amount equal to that by which the antifriction roller 58 will fail to go to its top dead center position illustrated in FIG. 7B, and this amount is designated by the distance X, which determines that the rotation or pivoting of the crank end portion 53 from the position illustrated in FIG. 7 to the position illustrated in FIG. 7A will be 180° minus $a$, where $a$ is the arcuate distance between the center line of the antifriction roller 58 and the vertical center line of the ram 31, when the ram 31 reaches its extreme upper position, designated by the stroke distance Y plus Z. Thus, the angle $a$ in FIG. 7A is determined by the range of thickness variation of the workpiece WP.

When the ram 31 engages a workpiece WP of greater thickness than the minimum thickness for which the mechanism is designed to clamp, for example, a workpiece differing from the minimum workpiece thickness by an amount X, and the ram is in the extreme upward position permitted with the workpiece WP clamped between the ram 31 and the clamp plate 23, the sleeve 52 does not rotate a full 180°, but rotates an amount less than 180° by the angle $a$, because the ram is stopped by abutment of the workpiece WP against the clamp plate 23. Continued rotation of the pinion gear and spring end 66 is operative to further tension the spring 65, the spring pin 70 being pivoted away from the abutment edge 72 of the sleeve 52 in the manner illustrated in FIG. 8A.

It is thus readily seen that the amount of tensioning in the spring, above the preset tension in the spring 65 is evidenced by the relative displacement designated by the arc $a$ between the spring ends 66 and 67, the arc $a$ being dependent upon the distance X as set forth above.

The maximum angle $a$ at the clamping point that will frictionally hold the crank body 52 and the antifriction roller 58 in the transverse slot 45 of the ram 31 immobile at the clamping point can be arrived at mathematically by the equation:

$$\frac{AB}{Y} = \text{sine of angle } a, \text{ in which,}$$

A = The coefficient of sliding friction between the material used in the crank body 52 and the material used in the stationary bushing 50:

B = The radius of the bearing diameter of the crank body or sleeve 52 in inches:

Y = The crank axis distance of the antifriction roller bearing 58 in inches.

The self-locking feature of this invention, whereby the ram 31 maintains the workpiece WP in contact against the clamp plate 23 under the applied clamping force, with the ends 66 and 67 of the spring 65 relatively displaced through the arc $a$ as viewed in FIG. 8A, is due to frictional forces between relatively movable parts of the mechanism, retaining the end 66 of the spring 65 in its stressed condition, with the end 71 of the pin 70 spaced from the pin abutment edge 72 of the slot 68 of the sleeve 52. The frictional forces developed between most of the relatively moving parts of this invention provide sufficient force to overcome the clamping force supplied to the workpiece WP. In particular, the frictional forces between the teeth of the rack and pinion, as well as the frictional forces between the bore 76 of the housing portion 74 and the rack 77 are operative to maintain the end 66 of the spring 65 in its stressed condition illustrated in FIG. 8A. Additionally, even if these additional tensioning forces were relaxed such that the end 71 of the pin 70 was permitted to engage the abutment edge 72 of the slot 68 of the sleeve 52, frictional forces between the sleeve 52 and the bushing 50, as well as frictional forces between the role roller 58 and the surfaces 46, 47 and 48 of the slot 45 of the ram 31 are sufficient to maintain the ram 31 at the clamping point illustrated in FIG. 2, with the workpiece WP engaged against the clamp plate 23. Thus, upon removal of the motive force M illustrated in FIG. 1, the clamping force effected by the relative displacement $a$ of the spring ends 66 and 67 is operative to maintain the workpiece WP secured clamped against the clamp plate 23.

Upon applying an unclamping motive force M' against the abutment end 80 of the rack 77, and consequent linear movement of the rack 77 from the position illustrated in FIG. 1 of the drawings to the position illustrated in FIG. 3, the pinion gear 85 is rotated in a counterclockwise direction as viewed in FIG. 3, whereby the extension portion 88 of the pinion gear 85 pivots the pin 70 first through an arc $a$, whereby the pin end 71 engages against the abutment edge 72 of the slot 68 of the sleeve 52, thereby relaxing the spring 65 to its original prestressed position, and the motive force M' is thereby transmitted through the pinion gear 85, pin 70 and sleeve 52, to pivot the antifriction roller 58 in a clockwise direction, as viewed in FIG. 7A, toward the position illustrated in FIG. 7. During the pivoting of the pin through the arc $a$, the clamping force of the ram 31 against the workpiece WP is first released, and during the subsequent pivoting of the sleeve 52 and the roller 58, the roller 58 is operative against the lower surface 47 of the slot 45 in the ram 31, to drive the ram 31 vertically downwardly, until the roller 58 is in its bottom center position, leaving the workpiece WP nested on its supporting member 25, as is illustrated in FIG. 4.

This completes a cycle of operation of the mechanism, with the workpiece WP being returned to its original position.

Throughout the longitudinal movement of the ram 31, the aligning member 43, with its aligning tongue 44 in engagement with the groove 42 of the ram 31 is operative to maintain the ram 31 oriented within its housing portions 20 and 21, preventing rotational displacement of the ram.

From the foregoing, it will be seen that novel and advantageous provisions have been made for carrying out the desired end. However, attention is again directed to the fact that additional variations may be made in this invention without departing from the spirit and scope thereof.

I claim:

1. A clamping mechanism comprising a clamp plate, means for holding a workpiece spaced from said plate, and means for moving the workpiece against said clamp plate, said moving means including a ram reciprocally movable through a workpiece moving path of travel to a workpiece clamping station, and spring means for clamping a workpiece against the clamp plate at said station under a clamping force within a predetermined force range, said spring means including a torsion spring.

2. The mechanism of claim 1 wherein said predetermined force range is dependent upon a tolerance range in the thickness of the workpiece.

3. The mechanism of claim 1 wherein driving means are operative through said torsion spring to rotate said spring and raise said ram through an eccentric connected to said spring.

4. The mechanism of claim 2 wherein means are provided for self-locking the ram in engagement with the workpiece under the applied clamping force at the clamping station, and within the clamping force range independent of an outside motive force.

5. The mechanism of claim 4 wherein the ram is adapted to withstand an opposing force greater than its clamping force when in engagement with the workpiece at the clamping station, wherein the opposing force is operative through a crank connected to the ram and within a small angle measured from a top dead center position of the crank, the small angle being dependent upon the tolerance deviation of the workpiece.

6. The mechanism of the claim 4 wherein said latter means include frictional forces between relatively movable parts.

7. The mechanism of claim 6 wherein said torsion spring is stressed by relative displacement on its ends, and said self-locking means is dependent upon said frictional forces between relatively movable parts retaining said spring ends in their relatively displaced condition.

8. A clamping mechanism comprising a clamp plate, a means for holding a workpiece spaced from said clamp plate, a reciprocally movable ram for moving a workpiece to said clamp plate and engaging the workpiece under clamping pressure, a rotatable drive means, torsion spring coupling means for limiting said clamping pressure, said torsion spring coupling means being operatively connected between said ram and said drive means, said means for holding said workpiece comprising a work supporting member secured beneath said clamp pipe, said supporting member having a bottom portion for receiving a workpiece, and a hole formed in said bottom portion for facilitating entry of said ram therethrough.

9. A clamping mechanism comprising a clamp plate, a means for holding a workpiece spaced from said clamp plate, a reciprocally movable ram for moving a workpiece to said clamp plate and engaging the workpiece under clamping pressure, a rotatable drive means, torsion spring coupling means for limiting said clamping pressure, said torsion spring coupling means being operatively connected between said ram and said drive means, said coupling means including said torsion spring and being rotatable about its longitudinal axis, a sleeve disposed concentrically about said spring, one end of said spring being connected to said sleeve, the other end of said spring connected to said drive means, and means connected to said sleeve for reciprocating said ram upon rotation of said spring.

10. The mechanism of claim 9 wherein said latter means comprise a crank means and include a follower member mounted at one end of said sleeve eccentrically offset from its longitudinal axis, the follower member being engaged in a transverse slot in said ram.

11. A clamping mechanism comprising a clamp plate, a means for holding a workpiece spaced from said clamp plate, a reciprocally movable ram for moving a workpiece to said clamp plate and engaging the workpiece under clamping pressure, a rotatable drive means, torsion spring coupling means for limiting said clamping pressure, said torsion spring coupling means being operatively connected between said ram and said drive means, said drive means comprising a linearly movable rack and a pinion gear.

12. The mechanism of claim 9 wherein means are provided for permitting relative arcuate displacement between said sleeve and one end of said spring.

13. The mechanism of claim 12 wherein said latter means include a arcuate slot in the sleeve and a pin engaged by the spring end adjacent the drive mean and slidable in said slot an amount corresponding to the clamping pressure of said ram against the workpiece.

14. The mechanism of claim 13 wherein said spring is pretensioned with said pin biased against one end of said slot.

15. The mechanism of claim 9 wherein said sleeve is frictionally retained in a bushing.

16 the mechanism of claim 15 wherein the spring ends are generally angularly displaceable an amount corresponding to tolerance deviation in the workpiece.

17. The mechanism of claim 8 wherein said ram is vertically movable in guiding means, and means are provided for maintaining a desired orientation of said ram.

18. The mechanism of claim 11 wherein said rack is responsive to movement provided by an external motive force.

19. The mechanism of claim 9 wherein said latter means comprise a crank having a frictionless bearing means associated in a ram slot.

20. The mechanism of claim 17 wherein a frictional forces between relatively movable parts provide a self-locking means whereby at a clamping point at which a workpiece contacts the clamp plate, and throughout a clamping force range of greater forces than the force at the clamping point, said frictional forces are operative to maintain a given applied clamping force to a given workpiece on said clamp plate.

21. The mechanism of claim 8 wherein said coupling means are operative to enable a firm clamping of the workpiece irrespective of tolerance variations in the thickness of the workpiece.

22. A torsion spring clamping mechanism comprising a rotatable drive means including a pinion gear responsive to an external motive force, a pretensioned torsion spring means rotatable about its longitudinal axis, a sleeve disposed concentrically about said spring means, one end of said spring means being connected to said sleeve and the other end of said spring means being connected to said rotatable drive means, crank means including a follower member mounted at one end of said sleeve eccentrically offset from its longitudinal axis, a reciprocally movable clamping ram, a slot in said clamping ram, said follower member being engaged in said slot for moving said clamping ram in response to rotation of said rotatable drive means acting through said spring means and said crank means.